(12) United States Patent
Yoshida et al.

(10) Patent No.: US 7,685,812 B2
(45) Date of Patent: Mar. 30, 2010

(54) EXHAUST PURIFICATION DEVICE AND EXHAUST PURIFICATION METHOD OF INTERNAL COMBUSTION ENGINE

(75) Inventors: Kohei Yoshida, Susono (JP); Shinya Hirota, Susono (JP); Takamitsu Asanuma, Mishima (JP); Yasuaki Nakano, Sunto-gun (JP); Shunsuke Toshioka, Numaza (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1332 days.

(21) Appl. No.: 10/537,748

(22) PCT Filed: Oct. 4, 2004

(86) PCT No.: PCT/JP2004/014981

§ 371 (c)(1),
(2), (4) Date: Jun. 6, 2005

(87) PCT Pub. No.: WO2005/035952

PCT Pub. Date: Apr. 21, 2005

(65) Prior Publication Data

US 2006/0037312 A1 Feb. 23, 2006

(30) Foreign Application Priority Data

Oct. 10, 2003 (JP) .............................. 2003-352619

(51) Int. Cl.
*F01N 3/00* (2006.01)

(52) U.S. Cl. .............................. 60/295; 60/284; 60/301

(58) Field of Classification Search .................... 60/284, 60/295, 300, 301
See application file for complete search history.

(56) References Cited

U.S. PATENT DOCUMENTS 6,938,412 B2 * 9/2005 Li et al. ......................... 60/300
2003/0074893 A1 4/2003 Webb et al.

FOREIGN PATENT DOCUMENTS

| CN | 1330745 A | 1/2002 |
|---|---|---|
| EP | 1 010 870 A1 | 6/2000 |
| JP | A 6-108826 | 4/1994 |
| JP | A 7-139340 | 5/1995 |
| JP | A 2002-276343 | 9/2002 |
| WO | WO 00/23694 | 4/2000 |

* cited by examiner

*Primary Examiner*—Thomas E Denion
*Assistant Examiner*—Diem Tran
(74) *Attorney, Agent, or Firm*—Oliff & Berridge, PLC

(57) ABSTRACT

A $NO_x$ storing catalyst (11) comprising a precious metal catalyst (46) and $NO_x$ absorbent (47) is arranged in an exhaust passage. When the air-fuel ratio of the exhaust gas is lean, the storing catalyst cold stores the $NO_2$ contained in the exhaust in the absorbent when the catalyst is inactive and hot stores the cold stored $NO_2$ in the absorbent when the catalyst is made active. The $NO_2$ contained in the exhaust is cold stored in the absorbent when the catalyst is not activated, and when a predetermined $NO_x$ storing catalyst restoring condition (107) is met, a $NO_x$ storing catalyst restoring control (109, 115) including raising the $NO_x$ storing catalyst temperature to a predetermined temperature to active it (109) is executed so as to restore the cold storing capability of the $NO_x$ absorbent.

3 Claims, 9 Drawing Sheets

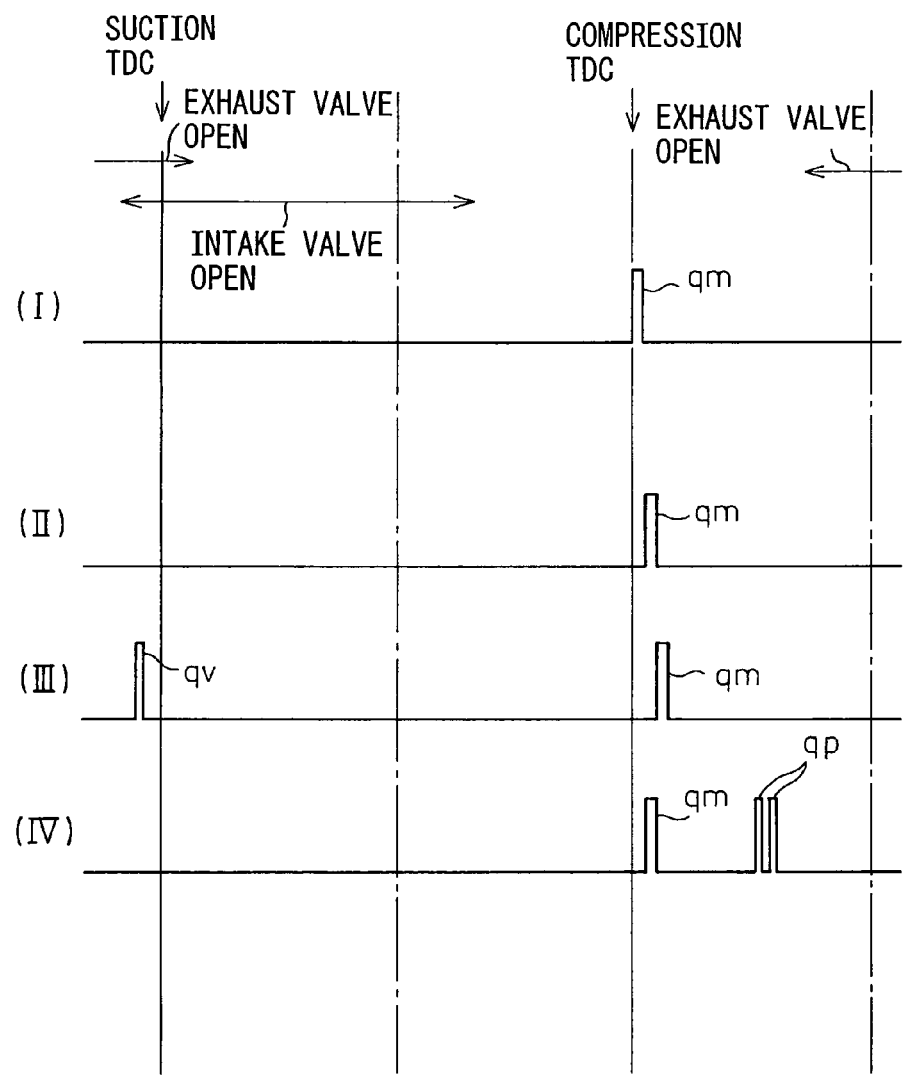

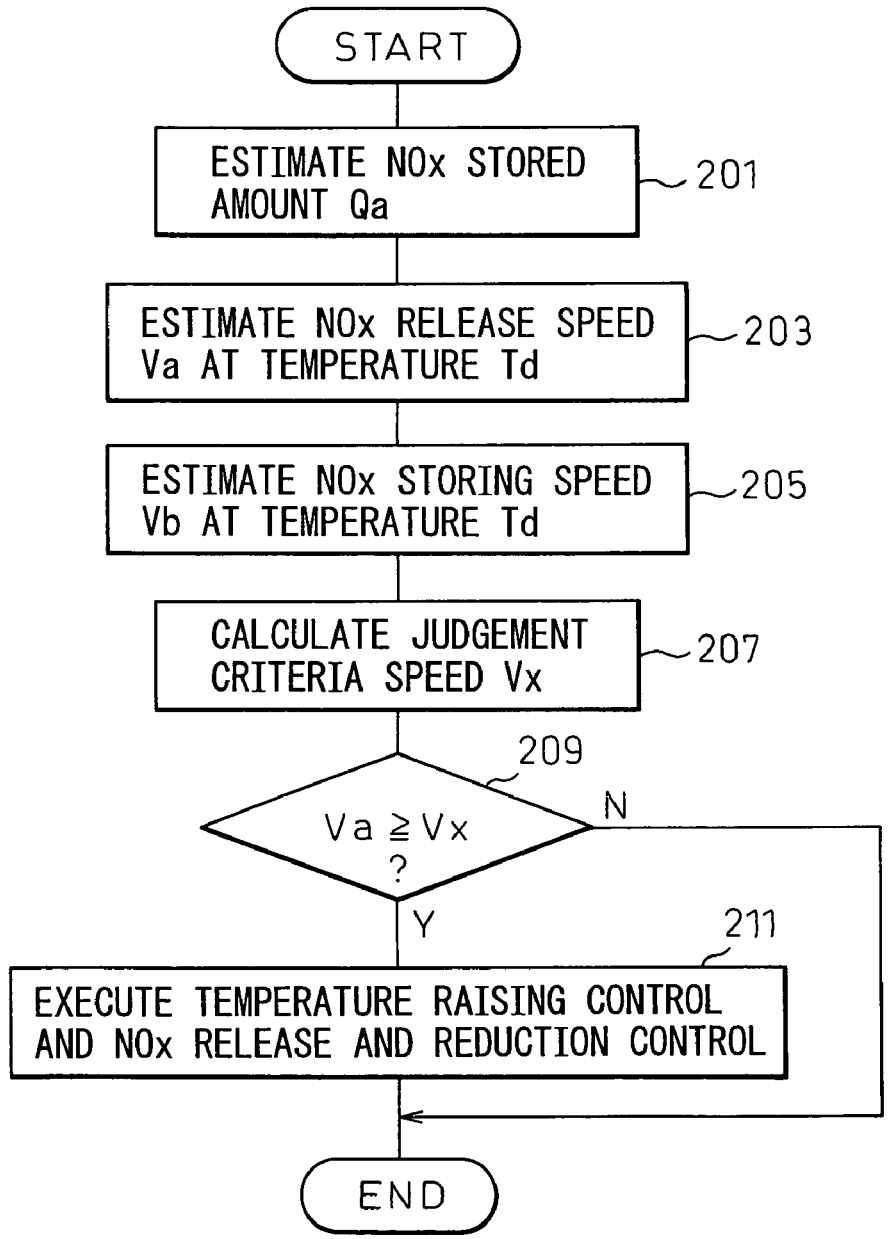

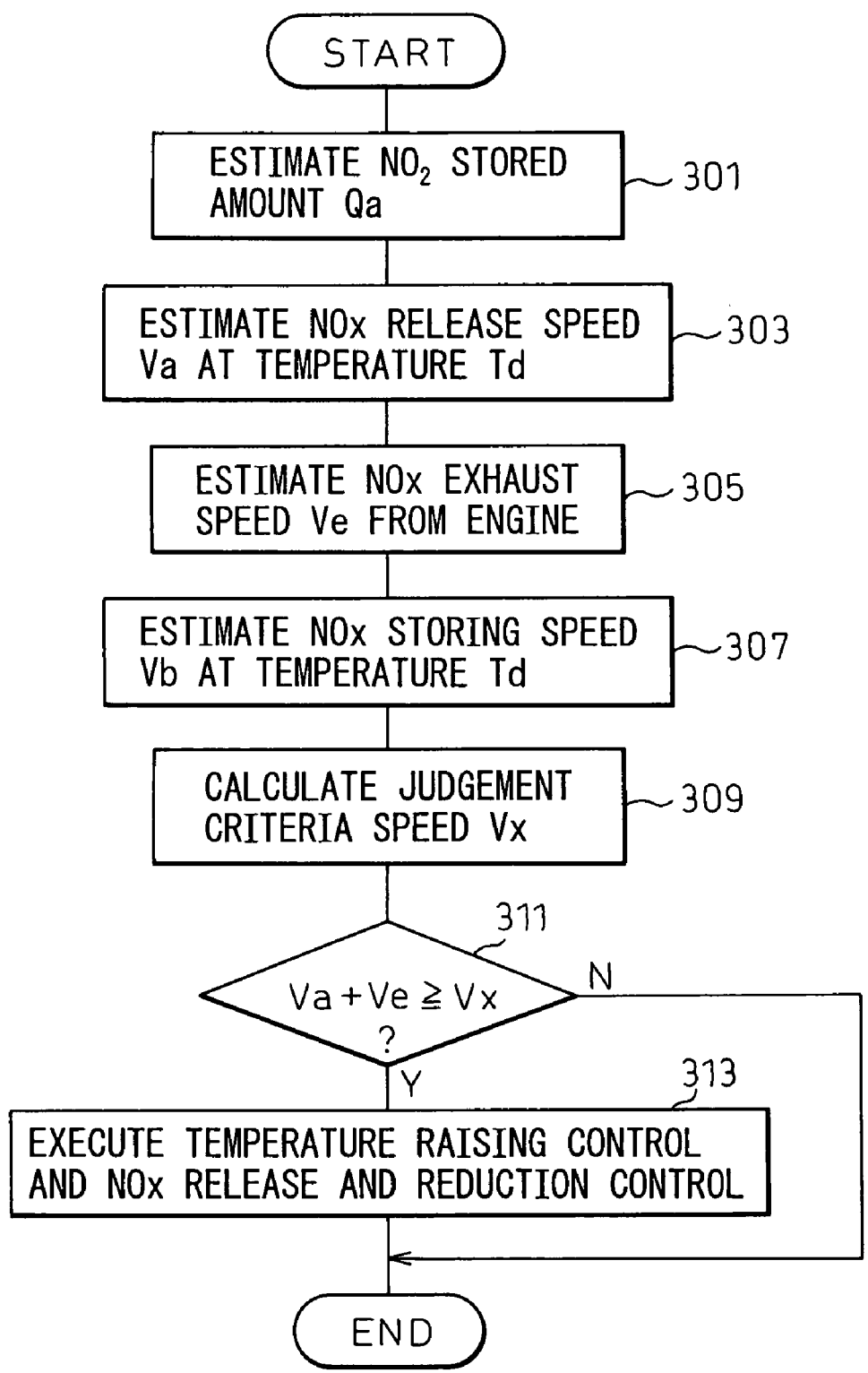

EXHAUST PURIFICATION DEVICE AND EXHAUST PURIFICATION METHOD OF INTERNAL COMBUSTION ENGINE

TECHNICAL FIELD

The present invention relates to an exhaust purification device and exhaust purification method of an internal combustion engine.

BACKGROUND ART

As a catalyst for purifying $NO_x$ contained in exhaust gas when fuel is burned under a lean air-fuel ratio, there is known a catalyst comprised of a carrier made of alumina on the surface of which a layer of a $NO_x$ absorbent comprised of an alkali metal or alkali earth is formed and on the surface of which a precious metal catalyst such as platinum is carried (for example, see Japanese Unexamined Patent Publication (Kokai) No. 6-108826). In this catalyst, when the catalyst is activated and the air-fuel ratio of the exhaust gas is lean, the $NO_x$ contained in the exhaust gas is stored in the $NO_x$ absorbent, while when the air-fuel ratio of the exhaust gas is made rich, the $NO_x$ which had been stored in the $NO_x$ absorbent is released and reduced.

However, this $NO_x$ absorption and release action is believed not to be performed when the catalyst is not activated. Therefore, in the internal combustion engine described in the above publication, when the catalyst is not activated, the catalyst is heated by an electric heater.

DISCLOSURE OF THE INVENTION

The inventors researched catalysts designed to perform this $NO_x$ absorption and release action and as a result discovered that while the nitrogen monoxide NO contained in exhaust gas is not stored in the $NO_x$ absorbent when the catalyst is not activated, nitrogen dioxide $NO_2$ contained in exhaust gas is stored in the $NO_x$ absorbent (cold stored) even when the catalyst is not activated by a mechanism different from that by which nitrogen monoxide NO is stored when the catalyst is activated.

An object of the present invention is to provide an exhaust purification device and exhaust purification method designed to purify exhaust gas utilizing this fact discovered by the inventors.

According to a first aspect of the present invention, there is provided an exhaust purification device for an internal combustion engine having, a $NO_x$ storing catalyst arranged in an engine exhaust passage, the $NO_x$ storing catalyst being comprised of a precious metal catalyst and a $NO_x$ absorbent and, when an air-fuel ratio of inflowing exhaust gas is lean, cold storing nitrogen dioxide $NO_2$ contained in the exhaust gas in the $NO_x$ absorbent when not activated and hot storing cold stored nitrogen dioxide $NO_2$ in the $NO_x$ absorbent when activated, the exhaust purification device for an internal combustion engine making the nitrogen dioxide $NO_2$ contained in the exhaust gas be cold stored in the $NO_x$ absorbent in the state where the $NO_x$ storing catalyst is not activated and executing a $NO_x$ storing catalyst restoring control including at least raising the temperature of the $NO_x$ storing catalyst to a predetermined temperature to activate it when a predetermined $NO_x$ storing catalyst restoring condition is met so as to restore the cold storing capability of the $NO_x$ absorbent in the state where the $NO_x$ storing catalyst is not activated.

According this aspect of the invention, it is possible to remove the $NO_2$ in the exhaust gas even in the state where the $NO_x$ storing catalyst is not activated. Further, in this $NO_x$ storing catalyst, if the $NO_x$ storing catalyst is raised in temperature to be activated, the nitrogen dioxide cold stored when it was not activated is released in the form of nitrogen monoxide NO, is oxidized to nitrogen dioxide $NO_2$ by the activated precious metal catalyst, and finally is hot stored in the $NO_x$ absorbent in the form of nitric acid ions $NO_3^-$. Therefore, by raising the temperature of the $NO_x$ storing catalyst to activate it, it is possible to restore the cold storing capability of the $NO_x$ absorbent in the state where the $NO_x$ storing catalyst is not activated. Accordingly, according to the first aspect of the present invention, by suitably setting the $NO_x$ storing catalyst restoring condition, it is possible to maintain the cold storing capability of the $NO_x$ absorbent in the state where the $NO_x$ storing catalyst is not activated. Note that when differentiation is particularly required in this specification, the storing in the form of nitric acid ions $NO_3^-$ will be referred to as "hot storing" and the storing in the form of nitrous acid $NO_2^-$ will be referred to as "cold storing".

Preferably, the $NO_x$ storing catalyst restoring condition is set to be met before the cold storing capability of the $NO_x$ absorbent in the state where the $NO_x$ storing catalyst is not activated is saturated. According to this embodiment, by ensuring that the $NO_x$ storing catalyst restoring control executes before the cold storing capacity of the $NO_x$ absorbent becomes saturated, it is possible to prevent the nitrogen dioxide $NO_2$ failed to be stored from being released into the atmosphere.

Preferably, the $NO_x$ storing catalyst restoring condition is set so that the cold stored nitrogen dioxide $NO_2$ will not be released from the $NO_x$ absorbent in more than a predetermined amount when raising the temperature of and activating the $NO_x$ storing catalyst in the $NO_x$ storing catalyst restoring control.

As explained above, if raised in temperature and activated at the $NO_x$ storing catalyst restoring control, the $NO_x$ storing catalyst finally hot stores the nitrogen dioxide $NO_2$ cold stored when it was not activated in the $NO_x$ absorbent in the form of nitric acid ions $NO_3^-$. However, if the amount of the nitrogen dioxide $NO_2$ cold stored when not activated is greater than the amount of $NO_x$ hot storable in the $NO_x$ absorbent when raising the temperature of the $NO_x$ storing catalyst to a predetermined temperature to activate it and is also greater than the amount of $NO_x$ storable in the $NO_x$ absorbent when raising the temperature of the $NO_x$ storing catalyst to a predetermined temperature to activate it, part of the nitrogen dioxide $NO_2$ cold stored is liable to end up being unintentionally released in the form of $NO_x$ when executing the $NO_x$ storing catalyst restoring control.

According to this embodiment, this point is considered in setting the $NO_x$ storing catalyst restoring condition, so when raising the temperature of the $NO_x$ storing catalyst to activate it in the $NO_x$ storing catalyst restoring control, it is possible to keep a large amount of cold stored nitrogen dioxide $NO_2$ from ending up being released unintentionally.

Note that here, "the cold stored nitrogen dioxide $NO_2$ not being released from the $NO_x$ absorbent in more than a predetermined amount" includes not only the case of cold stored nitrogen dioxide $NO_2$ not being actually released in more than a predetermined amount as nitrogen oxides $NO_x$ or not being released at more than a predetermined release speed, but also the case where the actual amount of release of nitrogen dioxide $NO_2$ per unit time calculated from the release speed of nitrogen oxides $NO_x$ at the time when cold stored nitrogen dioxide $NO_2$ is released from the $NO_x$ absorbent and the storing speed of nitrogen oxides $NO_x$ in the $NO_x$ absorbent is not more than a predetermined amount.

Preferably, the device has a $NO_2$ stored amount estimating means for estimating an amount of nitrogen dioxide $NO_2$ cold stored in the $NO_x$ absorbent and a $NO_x$ storable amount estimating means for estimating an amount of nitrogen oxides $NO_x$ able to be stored in the $NO_x$ absorbent when the $NO_x$ storing catalyst is at the predetermined temperature, and the $NO_x$ storing catalyst restoring condition is deemed to be met when the $NO_2$ stored amount estimated by the $NO_2$ stored amount estimating means becomes greater than or equal to a predetermined amount set to not more than the $NO_x$ storable amount based on the $NO_x$ storable amount estimated by the $NO_x$ storable amount estimating means.

As explained above, when for example the amount of the nitrogen dioxide $NO_2$ cold stored in the $NO_x$ absorbent is greater than the amount of nitrogen oxides $NO_x$ able to be cold stored in the $NO_x$ absorbent when the temperature of the $NO_x$ storing catalyst is the predetermined temperature, part of the cold stored nitrogen dioxide $NO_2$ may fail to be stored in the $NO_x$ absorbent and end up being released as $NO_x$ when raising the temperature of the $NO_x$ storing catalyst to activate it in the $NO_x$ storing catalyst restoring control.

As opposed to this, in this embodiment, since the $NO_x$ storing catalyst restoring condition is deemed to be met and the $NO_x$ storing catalyst restoring control is executed when the $NO_2$ stored amount estimated by the $NO_2$ stored amount estimating means becomes greater than or equal to a predetermined amount set to not more than the $NO_x$ storable amount based on the $NO_x$ storable amount estimated by the $NO_x$ storable amount estimating means, it is possible to keep the cold stored nitrogen dioxide $NO_2$ from being released when raising the temperature of the $NO_x$ storing catalyst to activate it in the $NO_x$ storing catalyst restoring control.

Preferably, the $NO_x$ storing catalyst is a $NO_x$ storing catalyst having the function of hot storing nitrogen oxides $NO_x$ contained in exhaust gas in the $NO_x$ absorbent when the $NO_x$ storing catalyst is activated and the air-fuel ratio of the exhaust gas flowing into the $NO_x$ storing catalyst is lean, the device has a $NO_x$ release speed estimating means for estimating a release speed of nitrogen oxides $NO_x$ from the $NO_x$ absorbent when making the $NO_x$ storing catalyst the predetermined temperature and a $NO_x$ storing speed estimating means for estimating a storing speed of nitrogen oxides $NO_x$ to the $NO_x$ absorbent when making the $NO_x$ storing catalyst the predetermined temperature, and the $NO_x$ storing catalyst restoring condition is deemed to be met when the $NO_x$ release speed estimated by the $NO_x$ release speed estimating means becomes greater than or equal to a predetermined speed set to not more than the $NO_x$ storing speed based on the $NO_x$ storing speed estimated by the $NO_x$ storing speed estimating means.

If the release speed of nitrogen oxides $NO_x$ when cold stored nitrogen dioxide $NO_2$ is released from the $NO_x$ absorbent when making the temperature of the $NO_x$ storing catalyst the predetermined temperature is less than the storing speed of nitrogen oxides $NO_x$ to the $NO_x$ absorbent when making the temperature of the $NO_x$ storing catalyst the predetermined temperature, it is conceivable that no cold stored nitrogen dioxide $NO_2$ will substantially be released when raising the temperature of the $NO_x$ storing catalyst to the predetermined temperature to activate it in the $NO_x$ storing catalyst restoring control.

This embodiment was made in consideration of this. When the $NO_x$ release speed estimated by the $NO_x$ release speed estimating means becomes greater than or equal to a predetermined speed set to not more than the $NO_x$ storing speed based on the $NO_x$ storing speed estimated by the $NO_x$ storing speed estimating means, it is deemed that the $NO_x$ storing catalyst restoring condition is met and the $NO_x$ storing catalyst restoring control is executed. Due to this, it is possible to substantially keep the cold stored nitrogen dioxide $NO_2$ from being released from the $NO_x$ absorbent when raising the temperature of the $NO_x$ storing catalyst to activate it in the $NO_x$ storing catalyst restoring control and as a result keep the stored nitrogen dioxide $NO_2$ from ending up being released into the atmosphere as $NO_x$.

Preferably, the $NO_x$ storing catalyst is a $NO_x$ storing catalyst having the function of hot storing nitrogen oxides $NO_x$ contained in exhaust gas in the $NO_x$ absorbent when the $NO_x$ storing catalyst is activated and the air-fuel ratio of the exhaust gas flowing into the $NO_x$ storing catalyst is lean, the device has a $NO_x$ release speed estimating means for estimating a release speed of nitrogen oxides $NO_x$ from the $NO_x$ absorbent when making the $NO_x$ storing catalyst the predetermined temperature, a $NO_x$ exhaust speed estimating means for estimating an exhaust speed of nitrogen oxides $NO_x$ from the internal combustion engine, and a $NO_x$ storing speed estimating means for estimating a storing speed of nitrogen oxides $NO_x$ to the $NO_x$ absorbent when making the $NO_x$ storing catalyst the predetermined temperature, and the $NO_x$ storing catalyst restoring condition is deemed to be met when a sum of the $NO_x$ release speed estimated by the $NO_x$ release speed estimating means and the $NO_x$ exhaust speed estimated by the $NO_x$ exhaust speed estimating means becomes greater than or equal to a predetermined speed set to not more than the $NO_x$ storing speed based on the $NO_x$ storing speed estimated by the $NO_x$ storing speed estimating means.

For example, if the release speed of nitrogen oxides $NO_x$ when cold stored nitrogen dioxide $NO_2$ is released from the $NO_x$ absorbent when making the temperature of the $NO_x$ storing catalyst the predetermined temperature is the same as the storing speed of nitrogen oxides $NO_x$ to the $NO_x$ absorbent when making the temperature of the $NO_x$ storing catalyst the predetermined temperature, it is conceivable that no cold stored nitrogen dioxide $NO_2$ will be released when raising the temperature of the $NO_x$ storing catalyst to the predetermined temperature to activate it in the $NO_x$ storing catalyst restoring control. However, in this case, the nitrogen oxides $NO_x$ exhausted from the internal combustion engine will end up being released into the atmosphere as they are during the $NO_x$ storing catalyst restoring control.

As opposed to this, according to this embodiment, when the sum of the $NO_x$ release speed estimated by the $NO_x$ release speed estimating means and the $NO_x$ exhaust speed estimated by the $NO_x$ exhaust speed estimating means becomes greater than or equal to a predetermined speed set to not more than the $NO_x$ storing speed based on the $NO_x$ storing speed estimated by the $NO_x$ storing speed estimating means, it is deemed that the $NO_x$ storing catalyst restoring condition is met and the $NO_x$ storing catalyst restoring control is executed, so it is possible to keep the nitrogen oxides $NO_x$ exhausted from the internal combustion engine from being released into the atmosphere at the time of the $NO_x$ storing catalyst restoring control.

Preferably, the $NO_x$ storing catalyst has the function of releasing, reducing, and purifying the nitrogen oxides $NO_x$ which had been hot stored in the $NO_x$ absorbent when the $NO_x$ storing catalyst is activated and when making the air-fuel ratio of the exhaust gas flowing into the $NO_x$ storing catalyst smaller and establishing the presence of a reducing agent in state, and the $NO_x$ storing catalyst restoring control includes making the air-fuel ratio of the exhaust gas flowing into the $NO_x$ storing catalyst smaller and establishing the presence of a reducing agent in state. According to this embodiment, by performing the $NO_x$ storing catalyst restoring control, it is possible to release, reduce, and purify the nitrogen oxides $NO_x$ hot stored in the $NO_x$ absorbent.

Preferably, the device further has a $NO_2$ ratio increasing means for increasing a ratio of nitrogen dioxide $NO_2$ with respect to nitrogen monoxide NO produced at the time of combustion under a lean air-fuel ratio when the $NO_x$ storing catalyst is not activated compared with when the $NO_x$ storing catalyst is activated in the same engine operating state.

The $NO_x$ storing catalyst can cold store nitrogen dioxide $NO_2$ in the $NO_x$ absorbent even when not activated when the air-fuel ratio of the inflowing exhaust gas is lean. Therefore, according to this embodiment, it is possible to improve the $NO_x$ purification rate when the $NO_x$ storing catalyst is not activated.

According to a second aspect of the invention, there is provided an exhaust purification method for an internal combustion engine including, arranging a $NO_x$ storing catalyst in an engine exhaust passage, the $NO_x$ storing catalyst being comprised of a precious metal catalyst and a $NO_x$ absorbent and, when an air-fuel ratio of inflowing exhaust gas is lean, cold storing nitrogen dioxide $NO_2$ contained in the exhaust gas in the $NO_x$ absorbent when not activated and hot storing cold stored nitrogen dioxide $NO_2$ in the $NO_x$ absorbent when activated, making the nitrogen dioxide $NO_2$ contained in the exhaust gas be cold stored in the $NO_x$ absorbent in the state where the $NO_x$ storing catalyst is not activated and raising the temperature of the $NO_x$ storing catalyst to a predetermined temperature to activate it so as to restore the cold storing capability of the $NO_x$ absorbent in the state where the $NO_x$ storing catalyst is not activated before the cold storing capability of the $NO_x$ absorbent in the state where the $NO_x$ storing catalyst is not activated is saturated.

According to the second aspect of the invention, it is possible to remove $NO_2$ in the exhaust gas even when the $NO_x$ storing catalyst is not activated. Further, in the $NO_x$ storing catalyst, when the $NO_x$ storing catalyst is raised in temperature to be activated, the nitrogen dioxide $NO_2$ cold stored when not activated is finally hot stored in the $NO_x$ absorbent in the form of nitric acid ions $NO_3^-$, so the cold storing capability of the $NO_x$ absorbent in the state where the $NO_x$ storing catalyst is not activated can be restored. Accordingly, according to this aspect of the invention, the cold storing capacity of the $NO_x$ absorbent in the state where the $NO_x$ storing catalyst is not activated can be maintained.

BRIEF DESCRIPTION OF DRAWINGS

These and other objects and features of the present invention will become clearer from the following description of the preferred embodiments given with reference to the attached drawings, wherein:

FIG. 6 is a view of various injection patterns of fuel;

FIG. 7 is a flow chart of a control routine of another method workable by the configuration shown in FIG. 1;

FIG. 8a is a view of the relationship between a $NO_x$ release speed and a $NO_x$ stored amount, while

FIG. 9 is a flow chart of a control routine of still another method workable by the configuration shown in FIG. 1.

BEST MODES FOR CARRYING OUT THE INVENTION

Preferred embodiments of the present invention will be described in detail below while referring to the attached figures.

Figure 1:
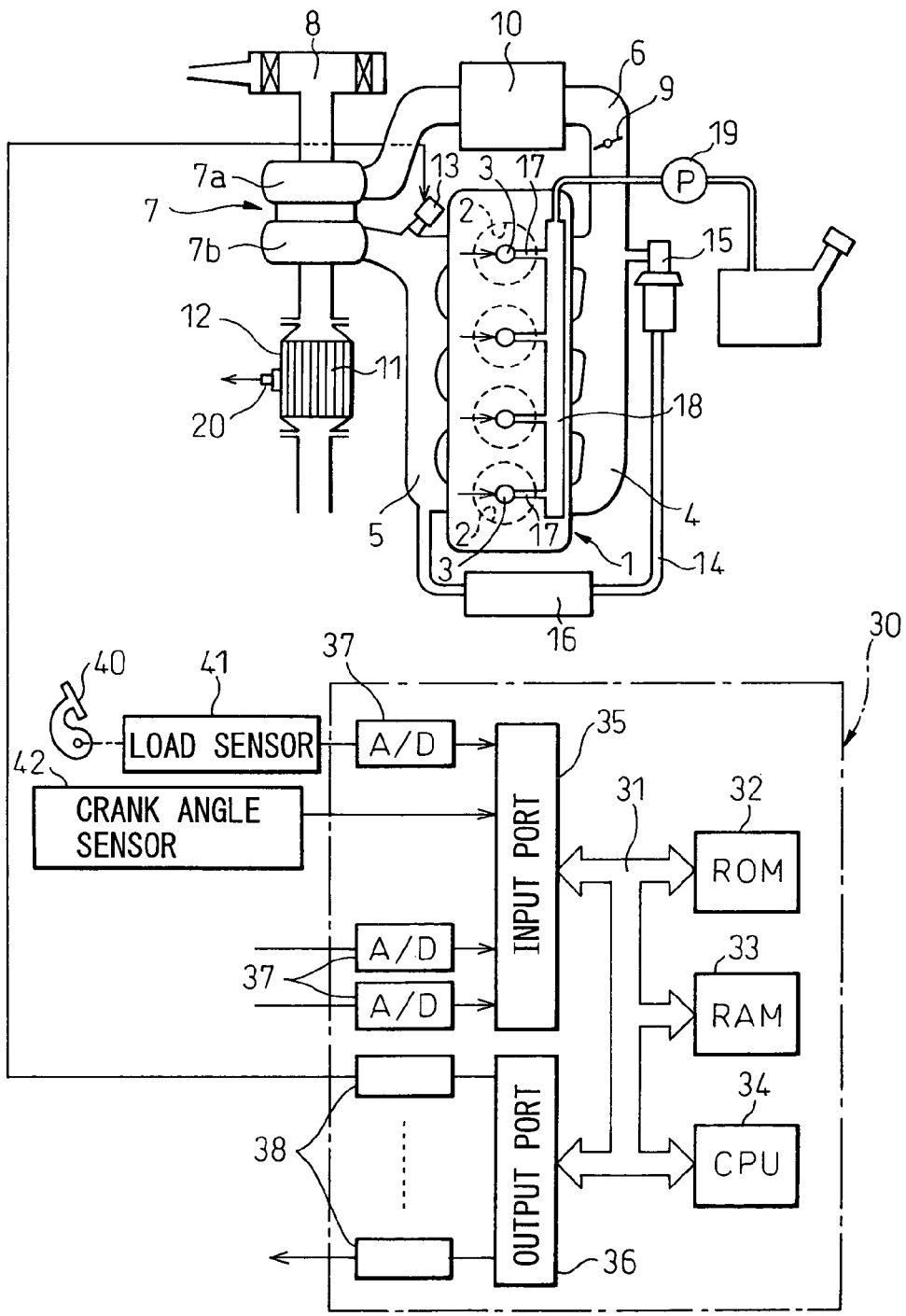
FIG. 1 shows the case of application of the present invention to a compression ignition type internal combustion engine.

FIG. 1 shows the case of application of the present invention to a compression ignition type internal combustion engine. Note that the present invention may also be applied to a spark ignition type internal combustion engine.

Referring to FIG. 1, 1 indicates an engine body, 2 indicates a combustion chamber of each cylinder, 3 indicates an electronically controlled fuel injector for injecting fuel into each combustion chamber 2, 4 indicates an intake manifold, and 5 indicates an exhaust manifold. The intake manifold 4 is connected through an intake duct 6 to an outlet of a compressor 7a of an exhaust turbocharger 7. The inlet of the compressor 7a is connected to an air cleaner 8. Inside the intake duct 6 is arranged a throttle valve 9 driven by a step motor. Further, around the intake duct 6 is arranged a cooling device (intercooler) 10 for cooling the intake air flowing through the inside of the intake duct 6. In the embodiment shown in FIG. 1, the engine cooling water is guided into the intercooler 10. The engine cooling water cools the intake air. On the other hand, the exhaust manifold 5 is connected to an inlet of an exhaust turbine 7b of the exhaust turbocharger 7, while the outlet of the exhaust turbine 7b is connected to a casing 12 housing a $NO_x$ storing catalyst 11. The header outlet of the exhaust manifold 5 is provided with a reducing agent supply valve 13 for supplying a reducing agent comprised of for example a hydrocarbon into the exhaust gas flowing through the inside of the exhaust manifold 5.

The exhaust manifold 5 and the intake manifold 4 are linked together through an exhaust gas recirculation (hereinafter referred to as an "EGR") passage 14. The EGR passage 14 is provided with an electronically controlled EGR control valve 15. Further, around the EGR passage 14 is arranged a cooling device (EGR cooler) 16 for cooling the EGR gas flowing through the inside of the EGR passage 14. In the embodiment shown in FIG. 1, the engine cooling water is guided into the EGR cooler 16. The engine cooling water cools the EGR gas. On the other hand, each fuel injector 3 is linked through a fuel feed tube 17 to a fuel reservoir, that is, a so-called "common rail" 18. This common rail 18 is supplied with fuel from an electronically controlled variable discharge fuel pump 19. The fuel supplied into the common rail 18 is supplied through each fuel feed tube 17 to the fuel injector 3.

An electronic control unit 30 is comprised of a digital computer provided with a read only memory (ROM) 32, a random access memory (RAM) 33, a microprocessor (CPU) 34, an input port 35, and an output port 36 all connected to each other by a bidirectional bus 31. The $NO_x$ storing catalyst 11 is provided with a temperature sensor 20 for detecting the temperature of the $NO_x$ storing catalyst 11. The output signal of the temperature sensor 20 is input to the input port 35 through a corresponding AD converter 37. Further, an accelerator pedal 40 is connected to a load sensor 41 generating an output voltage proportional to the amount of depression L of the accelerator pedal 40. The output voltage of the load sensor 41 is input to the input port 35 through a corresponding AD converter 37. Further, the input port 35 has a crank angle sensor 42 generating an output pulse each time the crankshaft turns for example by 15 degrees connected to it. On the other hand, the output port 36 is connected through corresponding drive circuits 38 to the fuel injectors 3, throttle valve 9 step motor, reducing agent supply valve 13, EGR control valve 15, and fuel pump 19.

Figure 2A:
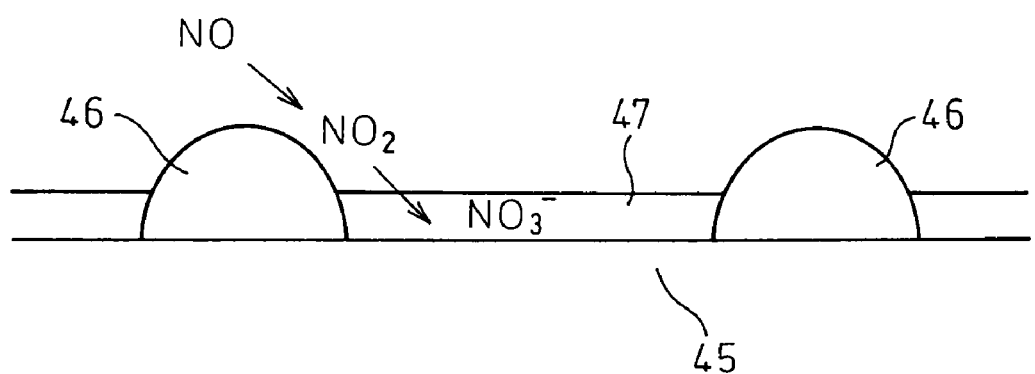
FIGS. 2a and 2b are views schematically showing cross-sections of the carrier surface part of a $NO_x$ storing catalyst.
Figure 2B:
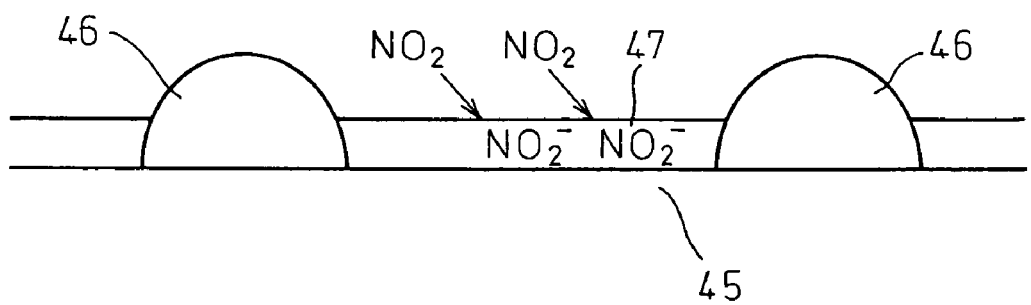

The $NO_x$ storing catalyst 11 shown in FIG. 1 is comprised of a monolithic catalyst. A base of the $NO_x$ storing catalyst 11 carries for example a catalyst carrier comprised of alumina. FIGS. 2a and 2b schematically show the cross-section of the surface part of this catalyst carrier 45. As shown in FIGS. 2a and 2b, the catalyst carrier 45 carries a precious metal catalyst 46 dispersed on its surface. Further, the catalyst carrier 45 is formed with a layer of a $NO_x$ absorbent 47 on its surface.

In this embodiment of the present invention, platinum Pt is used as the precious metal catalyst 46. As the ingredient forming the $NO_x$ absorbent 47, for example, at least one element selected from potassium K, sodium Na, cesium Cs, or another alkali metal, barium Ba, calcium Ca, or another alkali earth, lanthanum La, yttrium Y, or another rare earth may be used.

If the ratio of the air and fuel (hydrocarbons) supplied to the engine intake passage, combustion chambers 2, and exhaust passage upstream of the $NO_x$ storing catalyst 11 is referred to as the "air-fuel ratio of the exhaust gas", when the previous metal catalyst 46 is activated, that is, when the $NO_x$ storing catalyst 11 is activated, the $NO_x$ absorbent 47 performs a $NO_x$ absorption and release action of hot storing the $NO_x$ when the air-fuel ratio of the exhaust gas is lean and releasing the hot stored $NO_x$ when the oxygen concentration in the exhaust gas falls. Note that when fuel (hydrocarbons) or air is not being supplied to the exhaust passage upstream of the $NO_x$ storing catalyst 11, the air-fuel ratio of the exhaust gas matches the air-fuel ratio of the air-fuel mixture supplied to the combustion chambers 2. Therefore, in this case, the $NO_x$ absorbent 47 hot stores $NO_x$ when the air-fuel ratio of the air-fuel mixture supplied into the combustion chambers 2 is lean, while releases the hot stored $NO_x$ when the oxygen concentration in the air-fuel mixture supplied to the combustion chambers 2 falls.

That is, if explaining this taking as an example the case of using barium Ba as the ingredient forming the $NO_x$ absorbent 47, when the air-fuel ratio of the exhaust gas is lean, that is, when the oxygen concentration in the exhaust gas is high, if the precious metal catalyst 46 is activated, the NO contained in the exhaust gas is oxidized on the platinum Pt 46 such as shown in FIG. 2a to become $NO_2$, then is absorbed in the $NO_x$ absorbent 47 and disperses in the $NO_x$ absorbent 47 in the form of nitric acid ions $NO_3^-$ while bonding with the barium oxide BaO. In this way, the $NO_x$ is hot stored in the $NO_x$ absorbent 47. That is, storing in the form of nitric acid ions $NO_3^-$ is referred to as "hot storing". So long as the oxygen concentration in the exhaust gas is high, $NO_2$ is produced on the surface of the platinum Pt 46. So long as the hot storing capacity of the $NO_x$ absorbent 47 is not saturated, the $NO_2$ is hot stored in the $NO_x$ absorbent 47 and nitric acid ions $NO_3^-$ are produced.

As opposed to this, by making the air-fuel ratio in the combustion chambers 2 rich or the stoichiometric air-fuel ratio or by supplying a reducing agent from the reducing agent supply valve 13 so as to make the air-fuel ratio of the exhaust gas rich or the stoichiometric air-fuel ratio, the oxygen concentration in the exhaust gas falls, so the reaction proceeds in the reverse direction ($NO_3^- \rightarrow NO_2$) and therefore the nitric acid ions $NO_3^-$ in the $NO_x$ absorbent 47 are released from the $NO_x$ absorbent 47 in the form of $NO_2$, NO, etc. In this case, since the reducing agent (unburned HC, CO, etc.) is present in the exhaust gas, the released $NO_x$ is reduced by the reducing agent (unburned HC, CO, etc.) contained in the exhaust gas.

Now, the nitrogen oxides $NO_x$ in the exhaust gas are not hot stored in the $NO_x$ absorbent 47 in the form of nitrogen monoxide NO. They have to be converted to the form of nitrogen dioxide $NO_2$ or else will not be hot stored in the $NO_x$ absorbent 47. That is, the nitrogen monoxide NO contained in the exhaust gas has to be converted to nitrogen dioxide $NO_2$, that is, has to be oxidized, or will not be hot stored in the $NO_x$ absorbent 47. The platinum Pt 46 inherently has activity at a low temperature. However, the basicity of the $NO_x$ absorbent 47 is considerably strong. Therefore, the activity of the platinum Pt 46 at a low temperature, that is, the acidity, ends up becoming weak. As a result, if the temperature TC of the $NO_x$ storing catalyst 11 falls, the action of oxidation of the nitrogen monoxide NO to nitrogen dioxide becomes weaker. Therefore, to oxidize the nitrogen monoxide $NO_x$ it is necessary that the precious metal catalyst 46 be high in temperature and activated, that is, that the $NO_x$ storing catalyst 11 be activated. Therefore, up to now, to purify $NO_x$, it had been considered necessary that the precious metal catalyst 46 be activated, that is, that the $NO_x$ storing catalyst 11 be activated.

The inventors engaged in research on this $NO_x$ storing catalyst 11 and as a result learned that the nitrogen monoxide NO contained in the exhaust gas will not be stored in the $NO_x$ absorbent 47 until the platinum Pt 46 is activated, that is, unless the $NO_x$ storing catalyst 11 is activated, but nitrogen dioxide $NO_2$ will be cold stored in the $NO_x$ absorbent 47 in the form of nitrous acid $NO_2^-$ as shown in FIG. 2b even if the $NO_x$ storing catalyst 11 is not activated. Note that in this specification, the storage in the form of nitrous acid $NO_2^-$ will be referred to as "cold storing" to differentiate it from the above "hot storing". Further, when it is not necessary to particularly differentiate the hot storing and cold storing, "storing" will be simply referred to.

Further, since cold storing of $NO_2$ is possible even if the $NO_x$ storing catalyst 11 is not activated, the "activation of the $NO_x$ storing catalyst 11" in this specification means a state where nitrogen monoxide NO can be oxidized to nitrogen dioxide $NO_2$ and hot stored in the $NO_x$ absorbent 47 when the air-fuel ratio of the inflowing exhaust gas is lean and further a state where the $NO_x$ stored in the $NO_x$ absorbent 47 can be released and reduced if reducing the air-fuel ratio of the inflowing exhaust gas (that is, making it rich or the stoichiometric air-fuel ratio) and establishing the presence of a reducing agent.

In this way, the nitrogen dioxide $NO_2$ is cold stored even if the $NO_x$ storing catalyst 11 is not activated, so in this embodiment of the present invention, the nitrogen dioxide $NO_2$ contained in the exhaust gas is made to be cold stored in the $NO_x$ absorbent in the state where the $NO_x$ storing catalyst 11 is not activated when the air-fuel ratio of the inflowing exhaust gas is lean and, for example, when the fuel is being burned under a lean air-fuel ratio. That is, in the compression ignition type internal combustion engine such as shown in FIG. 1, the air-fuel ratio of the exhaust gas is lean at the time of normal operation. Further, in this embodiment of the present invention, if not performing control for raising the temperature of the $NO_x$ storing catalyst 11 as explained later (temperature raising control), the $NO_x$ storing catalyst 11 is not activated.

Therefore, at the time of normal operation, the $NO_x$ absorbent 47 of the $NO_x$ storing catalyst 11 cold stores the nitrogen dioxide $NO_2$ contained in the exhaust gas.

However, if the operation where the air-fuel ratio of the exhaust gas is lean continues to be performed in the state where the $NO_x$ storing catalyst 11 is not activated, the cold storing capability ($NO_2$ storing capability) of the $NO_x$ absorbent 47 in the state where the $NO_x$ storing catalyst 11 is not activated will end up being saturated and therefore $NO_2$ will end up no longer being able to be cold stored by the $NO_x$ absorbent 47. Therefore, in this embodiment of the present invention, the $NO_x$ storing catalyst 11 is raised in temperature to activate it and restore the cold storing capability of the $NO_x$ absorbent 47 in the state where the $NO_x$ storing catalyst 11 is not activated before the cold storing capability of the $NO_x$ absorbent 47 becomes saturated.

That is, in the above way, when the $NO_x$ storing catalyst 11 is not activated, as shown in FIG. 2b, the nitrogen dioxide $NO_2$ contained in the exhaust gas is cold stored in the $NO_x$ absorbent 47. Further, if the temperature TC of the $NO_x$ storing catalyst 11 rises in this state, the nitrogen dioxide $NO_2$ which had been cold stored in the $NO_x$ absorbent 47 will be released in the form of nitrogen monoxide $NO_x$ will be oxidized to nitrogen dioxide $NO_2$ by the activated precious metal catalyst 46, and will be hot stored in the $NO_x$ absorbent 47. Therefore, when the $NO_x$ storing catalyst 11 is activated, the cold stored nitrogen dioxide $NO_2$ is hot stored in the $NO_x$ absorbent 47 in the form of nitric acid ions $NO_3^-$. Further, when the nitrogen dioxide $NO_2$ cold stored when it was not activated in this way is hot stored in the $NO_x$ absorbent in the form of nitric acid ions $NO_3^-$, the cold storing capacity of the $NO_x$ absorbent 47 in the state where the $NO_x$ storing catalyst 11 is not activated is recovered, that is, restored.

Utilizing this action, in this embodiment of the present invention, for example, when having the nitrogen dioxide $NO_2$ be cold stored in the $NO_x$ absorbent 47 in the state not activated, by repeatedly raising the temperature of the $NO_x$ storing catalyst 11 to activate it and then returning it to the inactive state, that is, by periodically raising the temperature of the $NO_x$ storing catalyst 11 and activating it, it is possible to restore and maintain the cold storing capability of the $NO_x$ absorbent 47. That is, in this case, raising the temperature of the $NO_x$ storing catalyst 11 to activate it forms a control for restoring the $NO_x$ storing catalyst ($NO_x$ storing catalyst restoring control). Note that the specific temperature TC of the $NO_x$ storing catalyst 11 in this case is for example 100 to 150° C. in the case of cold storing the nitrogen dioxide $NO_2$ in the nonactivated state and 300 to 400° C. in the case of raising the catalyst in temperature to activate it. As explained later, the $NO_x$ storing catalyst 11 is gradually activated by this temperature rise and along with this the ratio of the hot storing to the storing action as a whole increases. Therefore, in the above-mentioned case, when raising the temperature of the $NO_x$ storing catalyst 11 to activate it and cause hot storing of the cold stored nitrogen dioxide $NO_2$, it is preferable to sufficiently raise the temperature of the $NO_x$ storing catalyst 11 to activate it. For this, it is preferable to raise the temperature of the $NO_x$ storing catalyst 11 to activate it so that at least for example the ratio of the hot storing becomes greater than or equal to the ratio of the cold storing.

However, as explained above, the nitrogen dioxide $NO_2$ cold stored in the $NO_x$ absorbent 47 when the $NO_x$ storing catalyst 11 is not activated can be finally hot stored in the $NO_x$ absorbent 47 in the form of nitric acid ions $NO_3^-$ by raising the temperature of the $NO_x$ storing catalyst 11 to activate it. Further, as explained above, the $NO_x$ hot stored in the $NO_x$ absorbent 47 in this way is released and reduced by making the air-fuel ratio of the exhaust gas flowing into the $NO_x$ storing catalyst 11 smaller (that is, making it rich or the stoichiometric air-fuel ratio) and establishing the presence of a reducing agent in the state where the $NO_x$ storing catalyst 11 is activated.

Due to the above, in this embodiment of the present invention, when the $NO_x$ storing catalyst 11 is not activated, the nitrogen dioxide $NO_2$ contained in the exhaust gas is cold stored in the $NO_x$ absorbent 47. Then, after being used for a certain period, the temperature of the $NO_x$ storing catalyst 11 is raised to activate it so as to cause the cold stored nitrogen dioxide $NO_2$ to be hot absorbed in the $NO_x$ absorbent 47 before the cold storing capability of the $NO_x$ absorbent 47 becomes saturated. Further, the air-fuel ratio of the inflowing exhaust gas is made smaller and a reducing agent made present in state so as to release and reduce the hot stored nitrogen dioxide $NO_2$. By this method, it is possible to purify the nitrogen dioxide $NO_2$ in the exhaust gas and suppress the release of nitrogen oxides $NO_x$ into the atmosphere.

On the other hand, in the case of actually working the above method, when raising the temperature of the $NO_x$ storing catalyst 11 to activate it, the phenomenon of the cold stored nitrogen dioxide $NO_2$ ending up being released from the $NO_x$ absorbent 47 unintentionally (hereinafter called the "seepage phenomenon") sometimes occurs. Further, this seepage phenomenon occurs only when the amount of nitrogen dioxide $NO_2$ cold stored when the $NO_x$ storing catalyst 11 is not activated is large. Note that in this case, the cold stored nitrogen dioxide $NO_2$ is released in the form of NO or $NO_2$ etc. ($NO_x$).

Figure 3:
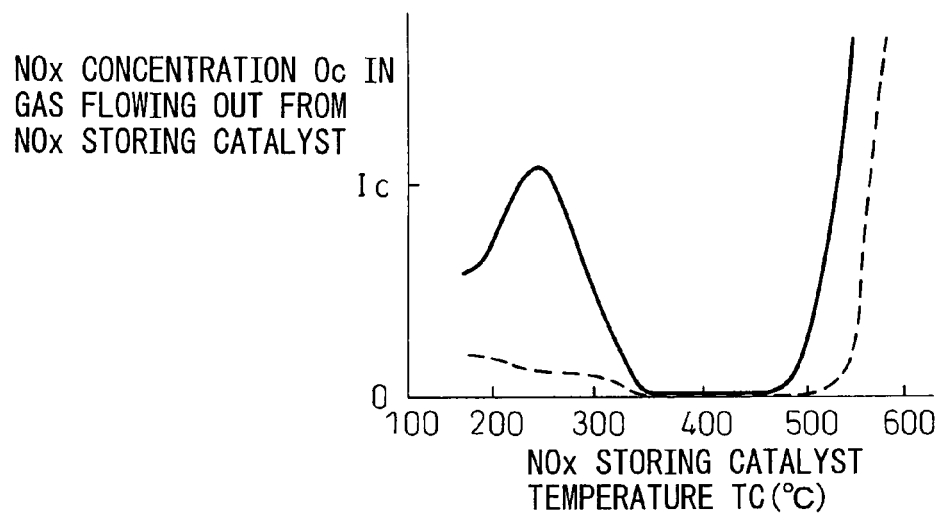
FIG. 3 is a view for explaining a seepage phenomenon.

FIG. 3 is a view of this phenomenon and shows the change in the $NO_x$ concentration Oc in the $NO_x$ storing catalyst outflowing exhaust gas in the case of raising the temperature of the $NO_x$ storing catalyst 11. The abscissa shows the temperature TC of the $NO_x$ storing catalyst 11, while the ordinate shows the $NO_x$ concentration in the exhaust gas flowing out from the $NO_x$ storing catalyst 11. In the figure, the solid line shows the case of a large amount of nitrogen dioxide $NO_2$ cold stored when the $NO_x$ storing catalyst 11 is not activated, while the broken line shows the case of a small amount of nitrogen dioxide $NO_2$ cold stored when the $NO_x$ storing catalyst 11 is not activated. Further, the $NO_x$ concentration Ic shows the $NO_x$ concentration in exhaust gas flowing into the $NO_x$ storing catalyst 11.

As seen in FIG. 3, when the amount of cold stored nitrogen dioxide $NO_2$ is large, sometimes the $NO_x$ concentration in the exhaust gas flowing out from the $NO_x$ storing catalyst 11 will become greater than the $NO_x$ concentration in the exhaust gas flowing in during the process of temperature rise. That is, when the amount of cold stored nitrogen dioxide $NO_2$ is great, the cold stored nitrogen dioxide $NO_2$ is released in the process of temperature rise.

Figure 4:
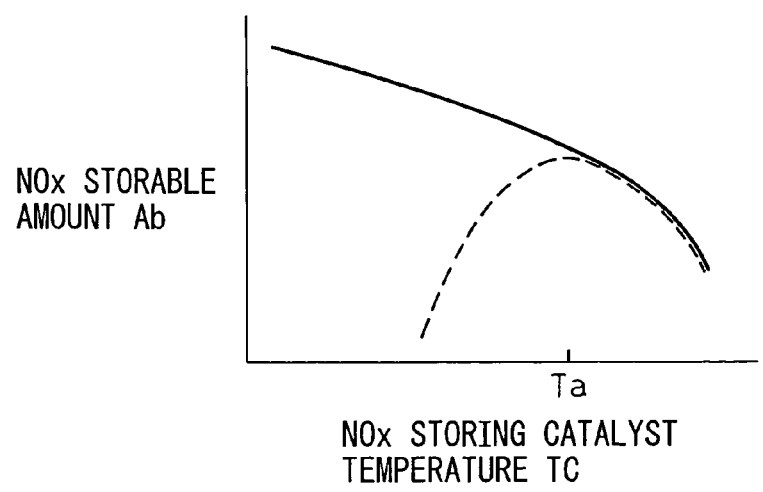
FIG. 4 is a view of the relationship between a $NO_x$ storable amount Ab and a temperature TC of a $NO_x$ storing catalyst.

Further, this seepage phenomenon is believed to occur since the $NO_x$ storable amount of the $NO_x$ absorbent 47 is greater before the rise in temperature, that is, when the $NO_x$ storing catalyst 11 is not activated, than after the rise in temperature, that is, when the $NO_x$ storing catalyst 11 is activated. That is, the relationship between the $NO_x$ storable amount Ab (including cold storable amount ($NO_2$ storable amount) of $NO_x$ absorbent 47 when the $NO_x$ storing catalyst 11 is not activated) and the temperature TC of the $NO_x$ storing catalyst 11 before and after activation of the $NO_x$ storing catalyst 11 is believed to become that as shown in FIG. 4. In the figure, the solid line shows the $NO_x$ storable amount Ab, while the broken line shows the hot storable amount in this. That is, the $NO_x$ storable amount Ab of the $NO_x$ absorbent 47 declines along with a rise of the temperature TC, while the hot storable amount rises along with a rise in the temperature TC, becomes maximum at the time of a certain temperature Ta, then declines along with a rise in the temperature TC.

Further, the ratio of the hot storable amount in the $NO_x$ storable amount Ab increases along with a rise in the temperature TC. At the above temperature Ta or more, the $NO_x$ storable amount Ab and the hot storable amount become substantially equal. That is, at the cold side, mainly cold storing is performed. When the temperature TC rises and the $NO_x$ storing catalyst 11 becomes active, the ratio of hot storing gradually increases. At the hot side, mainly hot storing is performed. That is, in this embodiment of the present invention, specifically, cold storing is performed even when the $NO_x$ storing catalyst 11 is activated. Therefore, for example, the expression of "cold storing when the $NO_x$ storing catalyst 11 is not activated" or "hot storing when the $NO_x$ storing catalyst 11 is activated" is intended to merely simplify the expression and is not intended to exclude the case of cold storing when the $NO_x$ storing catalyst is activated.

Now, as shown in FIG. 4, the $NO_x$ storable amount of the $NO_x$ absorbent 47 declines along with a rise of the temperature TC. In such a case, for example, when the $NO_x$ storing catalyst 11 is not activated (that is, before the rise in temperature), if the amount of cold stored nitrogen dioxide $NO_2$ is greater than the amount of storable $NO_x$ at the temperature after the temperature rise, part of the cold stored nitrogen dioxide $NO_2$ will fail to be stored and will be released. The above-mentioned seepage phenomenon is believed to occur due to this.

Below, the method of suppressing the occurrence of the seepage phenomenon explained above and using the $NO_x$ storing catalyst 11 to purify the $NO_2$ in the exhaust gas and suppress release of $NO_x$ into the atmosphere will be explained.

Figure 5:
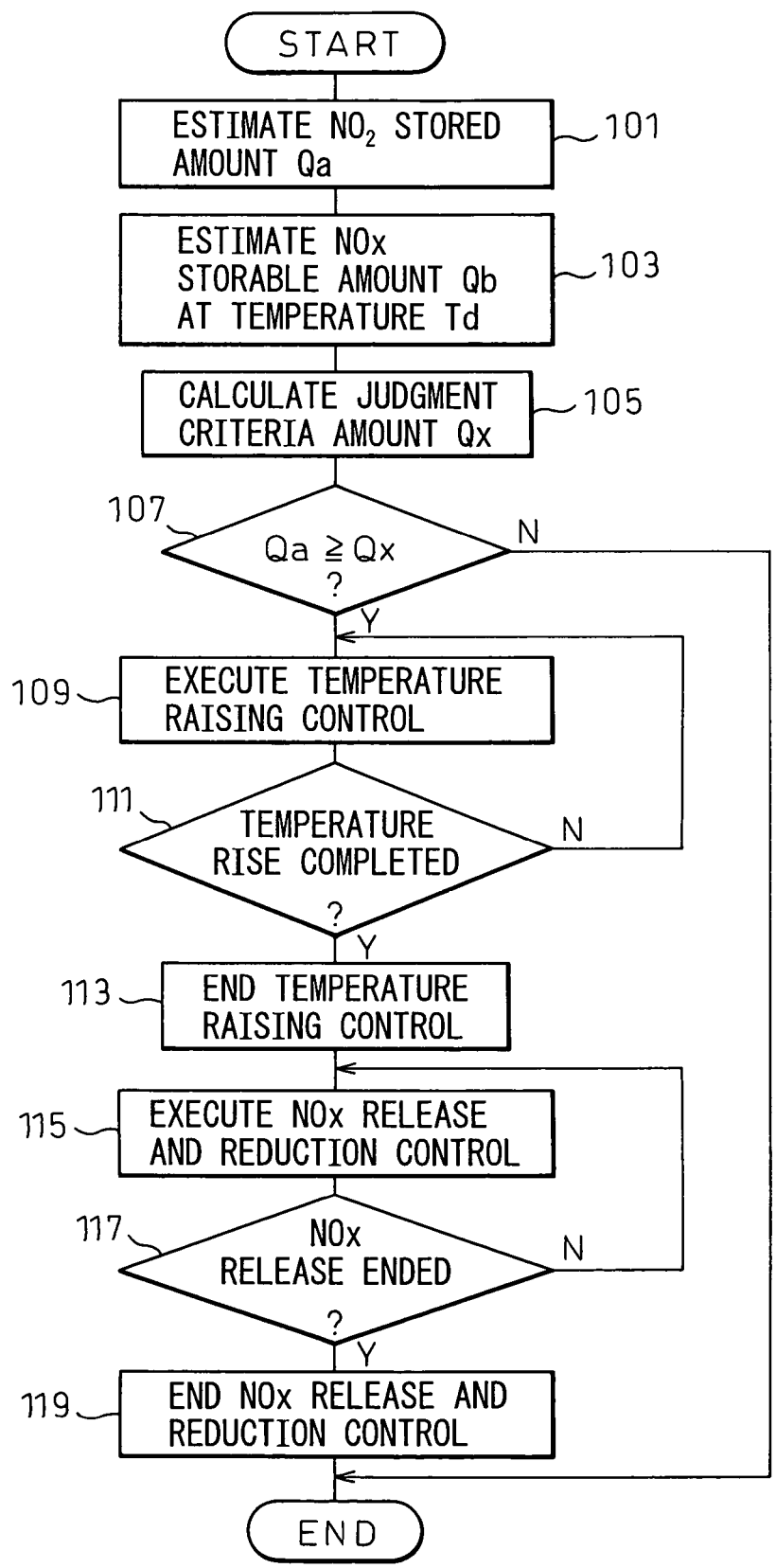
FIG. 5 is a flow chart of a control routine of a method workable by the configuration shown in FIG. 1.

FIG. 5 is a flow chart showing the control routine of a method able to be worked by the configuration shown in FIG. 1. This control routine is executed by interruption every certain time by the ECU 30 at the time of normal operation of the engine. As explained above, in a compression ignition type internal combustion engine such as shown in FIG. 1, the exhaust gas air-fuel ratio is lean at the time of normal operation. Further, the $NO_x$ storing catalyst 11 is in a not activated state. Therefore, the $NO_x$ absorbent 47 of the $NO_x$ storing catalyst 11 cold stores the nitrogen dioxide $NO_2$ contained in the exhaust gas.

When this control routine shown in FIG. 5 starts, first, at step 101, the $NO_2$ stored amount Qa at that point of time is estimated. This $NO_2$ stored amount Qa is estimated based on for example the type of the $NO_x$ storing catalyst 11 and the history of the operating state from when the previous $NO_x$ release and reducing control (explained later) ended. In this case, for example, the engine speed and fuel injection amount are used as indicators expressing the operating state. The $NO_2$ storing speed (amount of $NO_2$ stored per unit time) to the $NO_x$ absorbent 47 in each operating state expressed by these is found in advance by experiments etc. and stored as a map. The map is used to find the $NO_x$ stored amount Qa based on the history of the operating state. Note that if considering the effect of the temperature TC of the $NO_x$ storing catalyst 11 on the $NO_2$ storing speed, it is possible to find the $NO_2$ stored amount Qa more accurately.

When the $NO_2$ stored amount Qa is estimated at step 101, the routine proceeds to step 103. At step 103, the $NO_x$ storable amount Qb of the $NO_x$ absorbent 47 when the temperature TC of the $NO_x$ storing catalyst 11 is the predetermined temperature Td is estimated. Here, this temperature Td is a temperature predetermined as the temperature for performing the later explained $NO_x$ release and reducing control and is greater than or equal to the temperature where the $NO_x$ storing catalyst 11 at least starts to be activated (activation temperature). Most preferable as the temperature Td is the temperature at which the release and reduction of the $NO_x$ become most active.

The $NO_x$ storable amount Qb is estimated for example based on the type of the $NO_x$ storing catalyst 11 and the temperature Td. That is, for example, the relationship between the temperature TC of the $NO_x$ storing catalyst 11 and the $NO_x$ storable amount Qb is found in advance by experiments etc. and stored in a map. This map is used to find the $NO_x$ storable amount Qb corresponding to the above temperature Td.

When the $NO_x$ storable amount Qb is estimated at step 103, at the next step 105, the judgment criteria amount Qx is calculated based on the $NO_x$ storable amount Qb. This judgment criteria amount Qx is used in the following step 107 and for example is found by the equation $Qx=Qb-\alpha$ (where $\alpha \geq 0$). Here, the constant $\alpha$ is a safety margin for suppressing occurrence of the above seepage phenomenon and can be suitably set.

When the judgment criteria amount Qx is calculated at step 105, at the next step 107, it is judged if the $NO_2$ stored amount Qa is the judgment criteria amount Qx or more. When it is judged here that the $NO_2$ stored amount Qa is less than the judgment criteria amount Qx, this control routine ends and the engine continues normal operation. On the other hand, when it is judged that the $NO_2$ stored amount Qa is the judgment criteria amount Qx or more, the routine proceeds to step 109 where a temperature raising control is executed.

The temperature raising control performed at step 109 is control for raising the temperature TC of the $NO_x$ storing catalyst 11 to the above-mentioned temperature Td. In the present embodiment, this temperature raising control is performed by control of the fuel injection pattern as explained below. That is, FIG. 6 is a schematic view showing four examples of fuel injection patterns able to be used in the internal combustion engine shown in FIG. 1. Usually, the main fuel qm is injected near compression top dead center as shown in (I) in FIG. 6. As opposed to this, if the temperature raising control is started at step 109, for example, the fuel injection pattern shown in (II) of FIG. 6 is used. That is, the injection timing of the main fuel qm is delayed to after compression top dead center. If the injection timing of the main fuel qm is delayed to after compression top dead center in this way, the after burning period becomes longer and therefore the exhaust gas temperature rises. If the exhaust gas temperature rises, the temperature TC of the $NO_x$ storing catalyst 11 rises along with this.

Further, to raise the temperature TC of the $NO_x$ storing catalyst 11, it is also possible to inject auxiliary fuel qv near suction top dead center in addition to the main fuel qm as shown in (III) of FIG. 6. If additionally injecting auxiliary fuel qv in this way, the fuel to be burned increases by exactly the auxiliary fuel qv, so the exhaust gas temperature rises and therefore the temperature TC of the $NO_x$ storing catalyst 11 rises.

On the other hand, if injecting auxiliary fuel qv near suction top dead center in this way, due to the heat of compression during the compression stroke, aldehydes, ketones, peroxides, carbon monoxide, and other intermediate products are produced from the auxiliary fuel qv. These intermediate products accelerate the reaction of the main fuel qm. Therefore, in this case, as shown in (III) of FIG. 6, even if the injection timing of the main fuel qm is greatly delayed, good combustion can be obtained without causing misfires. That is, it is possible to greatly delay the injection timing of the main fuel qm, so the exhaust gas temperature becomes considerably high and accordingly the temperature TC of the $NO_x$ storing catalyst 11 can be quickly raised.

Further, to raise the temperature TC of the $NO_x$ storing catalyst 11, it is possible to inject auxiliary fuel qp during the expansion stroke or the exhaust stroke in addition to the main fuel qm as shown in (IV) of FIG. 6. That is, in this case, the majority of the auxiliary fuel qp is exhausted to the inside of the exhaust passage in the form of unburned HC without being burned. This unburned HC is oxidized by the surplus oxygen on the $NO_x$ storing catalyst 11. The heat of the oxidation reaction produced at this time causes the temperature TC of the $NO_x$ storing catalyst 11 to rise.

Note that in this embodiment of the present invention, the fuel injection pattern is controlled in the temperature raising control so as to maintain the air-fuel ratio of the exhaust gas in the lean state. This is because if the air-fuel ratio of the exhaust gas becomes rich or the stoichiometric air-fuel ratio in the temperature raising process, the cold stored $NO_2$ is liable to end up being released. In the temperature raising process, the temperature TC of the $NO_x$ storing catalyst 11 does not rise sufficiently, so reduction and purification are not possible when the cold stored $NO_2$ is released.

As explained above, when the $NO_x$ storing catalyst 11 is raised in temperature and activated by the temperature raising control, the nitrogen dioxide $NO_2$ cold stored in the $NO_x$ absorbent 47 before the $NO_x$ storing catalyst 11 was raised in temperature, that is, when it was still not activated, is finally hot stored in the $NO_x$ absorbent 47 in the form of nitric acid ions $NO_3^-$.

In this embodiment, due to the judgment at step 107, it is deemed that the amount (Qa) of $NO_2$ cold stored in the $NO_x$ absorbent 47 when this temperature raising control is executed is made not more than the amount (Qb) of the $NO_x$ storable in the $NO_x$ absorbent 47 when the temperature TC of the $NO_x$ storing catalyst 11 is raised to the temperature Td for activation. Therefore, according to this embodiment, it is possible to suppress the release of $NO_2$ cold stored in the $NO_x$ absorbent 47 in the state where the $NO_x$ storing catalyst 11 is not activated and raise the temperature of the $NO_x$ storing catalyst 11 to activate it. That is, it is possible to suppress the occurrence of the seepage phenomenon. Note that theoretically, by doing this, the release of $NO_2$ which had been cold stored is prevented at the time of raising the temperature of the $NO_x$ storing catalyst 11 to activate it, but in fact it is difficult to completely prevent the release of $NO_2$ as $NO_x$. Therefore, in actuality, by providing the judgment at step 107, the amount of release of $NO_2$ when released as $NO_x$ or the amount of release per unit time is prevented from being more than a predetermined set amount.

When the temperature raising control is started at step 109, the routine proceeds to step 111, where it is judged if the temperature rise of the $NO_x$ storing catalyst 11 has finished. That is, for example, when the temperature TC of the $NO_x$ storing catalyst 11 becomes the temperature Td or more, it is judged that the temperature rise has finished. In this embodiment, the temperature detected by the temperature sensor 20 is used for this judgment. When it is judged at step 111 that the temperature rise of the $NO_x$ storing catalyst 11 has not finished, the routine returns to step 109, where the temperature raising control is continued. On the other hand, when it is judged that the temperature rise of the $NO_x$ storing catalyst 11 has finished, the routine proceeds to step 113, where the temperature raising control is ended and the routine proceeds to step 115.

At step 115, a $NO_x$ release and reduction control for causing release of $NO_x$ from the $NO_x$ absorbent 47 and reducing it is executed. That is, while maintaining the state where the $NO_x$ storing catalyst 11 is activated, that is, while maintaining the temperature TC of the $NO_x$ storing catalyst 11 at the temperature Td or more, the air-fuel ratio of the exhaust gas flowing into the $NO_x$ storing catalyst 11 is made smaller and the presence of a reducing agent is established. More specifically, in this embodiment, the air-fuel ratio in the combustion chamber 2 is made rich or the stoichiometric air-fuel ratio or reducing agent is supplied from the reducing agent supply valve 13 so as to maintain the temperature TC of the $NO_x$ storing catalyst 11 at the temperature Td or more and intermittently or continuously make the air-fuel ratio of the exhaust gas rich or the stoichiometric air-fuel ratio. By doing this, the $NO_x$ is released from the $NO_x$ absorbent 47 and the released $NO_x$ is reduced and purified by the reducing agent (unburned HC, CO, etc.) present in the exhaust gas.

When the above-mentioned $NO_x$ release and reduction control is started at step 115, the routine proceeds to step 117, where it is judged if the release of $NO_x$ from the $NO_x$ absorbent 47 has been completed. This judgment is made by finding in advance the $NO_x$ release speed (amount of release of $NO_x$ per unit time) from the $NO_x$ absorbent 47 when the temperature TC of the $NO_x$ storing catalyst 11 is the above temperature Td by experiments etc. and judging if the released $NO_x$ amount in the current $NO_x$ release and reduction control estimated from the $NO_x$ release speed and the duration of the $NO_x$ release and reduction control has become greater than the $NO_2$ stored amount estimated at step 101. That is, it is judged that the release of $NO_x$ has been completed when it is judged that the above estimated released $NO_x$ amount has become greater than the $NO_2$ stored amount estimated at step 101.

At step 117, when it is judged that the release of $NO_x$ from the $NO_x$ absorbent 47 has still not been completed, the routine returns to step 115 where the $NO_x$ release and reduction control is continued. On the other hand, when it is judged that the release of $NO_x$ from the $NO_x$ absorbent 47 has been completed, the routine proceeds to step 119 where the $NO_x$ release and reduction control is ended and the control routine is ended.

As explained above, by this method, the temperature raising control is started when the estimated $NO_2$ stored amount Qa has become greater than or equal to the judgment criteria amount Qx set to not more than the $NO_x$ storable amount Qb based on the $NO_x$ storable amount Qb of the $NO_x$ absorbent 47 at the time when the temperature TC of the $NO_x$ storing catalyst 11 is the temperature Td. Therefore, it is possible to suppress the release of $NO_x$ occurring when cold stored $NO_2$ can not be completely stored when the temperature TC of the $NO_x$ storing catalyst 11 is raised to the temperature Td and the catalyst is activated. That is, according to this method, it is possible to suppress release of $NO_2$ cold stored in the $NO_x$ absorbent 47 in the state where the $NO_x$ storing catalyst 11 is not activated and raise the temperature of the $NO_x$ storing catalyst 11 for activation. That is, it is possible to suppress the occurrence of the above seepage phenomenon. Further, with this method, a $NO_x$ release and reduction control is executed, so it is possible to get $NO_x$ released from the $NO_x$ absorbent 47 and reduce and purify it.

In this way, according to this method, it is possible to suppress the occurrence of the seepage phenomenon and use the $NO_x$ storing catalyst 11 to purify the $NO_2$ in the exhaust gas and suppress the release of $NO_x$ into the atmosphere.

Next, another method workable by the configuration shown in FIG. 1, that is, another method of suppressing the occurrence of the seepage phenomenon explained above and using the NO$_x$ storing catalyst 11 to purify NO$_2$ in the exhaust gas and suppress the release of NO$_x$ into the atmosphere will be explained with reference to FIG. 7. Note that this method includes parts common with the method explained with reference to FIG. 5. Explanations of these parts will in principle be omitted.

If the NO$_x$ release speed (amount of release of NO$_x$ per unit time) when cold stored NO$_2$ is released from the NO$_x$ absorbent 47 when making the temperature TC of the NO$_x$ storing catalyst 11 the temperature Td for the NO$_x$ release and reduction control is less than or equal to the storing speed of NO$_x$ (amount of storage of NO$_x$ per unit time) to the NO$_x$ absorbent 47 when making the temperature TC of the NO$_x$ storing catalyst 11 the temperature Td, release of cold stored NO$_2$ may not substantially occur when raising the temperature TC of the NO$_x$ storing catalyst 11 to the temperature Td to activate the catalyst. The method explained below is based on this thinking.

Note that in the state where the temperature TC of the NO$_x$ storing catalyst 11 becomes the temperature Td and the NO$_x$ storing catalyst 11 is activated, the NO$_x$ in the exhaust gas is mainly hot stored at the NO$_x$ absorbent 47, but in this case as well, it cannot be said that there is no cold storing at all. That is, in the state where the NO$_x$ storing catalyst 11 is activated, the NO$_x$ in the exhaust gas is stored in the NO$_x$ absorbent 47 (including meanings of both cold storing and hot storing).

FIG. 7 is a flow chart showing the control routine of this method. This control routine is executed by interruption every certain time by the ECU 30 at the time of normal operation of the engine. When this control routine starts, first, at step 201, the NO$_2$ stored amount Qa at that point of time is estimated. The control at step 201 is similar to the control at step 101 of FIG. 5.

When the NO$_2$ stored amount Qa is estimated at step 201, the routine proceeds to step 203. At step 203, the release speed Va of NO$_x$ from the NO$_x$ absorbent 47 in the case where the temperature TC of the NO$_x$ storing catalyst 11 is the predetermined temperature Td is estimated. Here, the temperature Td is the temperature predetermined as the temperature for performing the NO$_x$ release and reduction control performed later and is greater than or equal to the temperature where the activation of the NO$_x$ storing catalyst 11 is at least started (activation temperature), in the same way as the case explained with reference to FIG. 5.

Figure 8A:
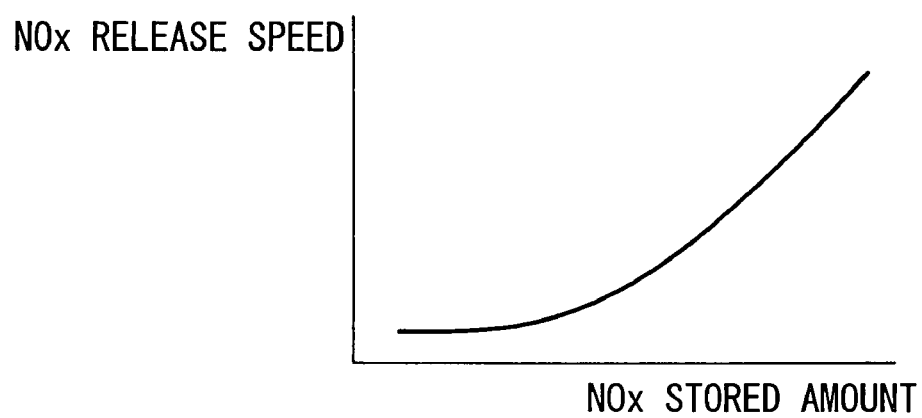

The NO$_x$ release speed Va is estimated based on for example the temperature Td and the NO$_2$ stored amount Qa. That is, the relationship between the amount of NO$_x$ including the NO$_2$ cold stored in the NO$_x$ absorbent 47 (NO$_x$ stored amount) and the amount of NO$_x$ released from the NO$_x$ absorbent 47 per unit time (NO$_x$ release speed) becomes a relationship where the NO$_x$ release speed becomes larger the greater the NO$_x$ stored amount as shown in FIG. 8a when the temperature of the NO$_x$ storing catalyst 11 is constant. Therefore, if finding in advance the relationship such as shown in FIG. 8a for when the temperature TC of the NO$_x$ storing catalyst 11 is the above temperature Td, by using the NO$_2$ stored amount Qa estimated at step 201 as the NO$_x$ stored amount, it is possible to find the corresponding NO$_x$ release speed, that is, the NO$_x$ release speed Va to be found.

When the NO$_x$ release speed Va is estimated at step 203, the routine proceeds to step 205. At step 205, the storing speed Vb of NO$_x$ to the NO$_x$ absorbent 47 when the temperature TC of the NO$_x$ storing catalyst 11 is the temperature Td is estimated. The NO$_x$ storing speed Vb is for example estimated based on the temperature Td and NO$_2$ stored amount Qa in the same way as the case of estimation of the NO$_x$ release speed Va.

Figure 8B:
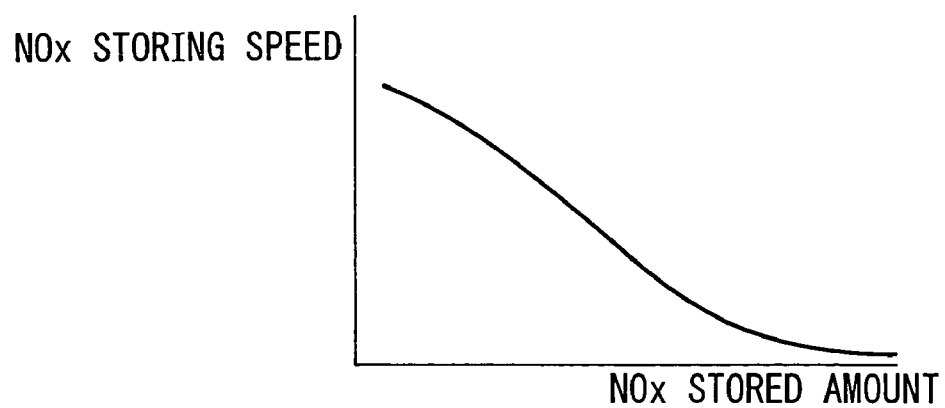
FIG. 8b is a view of the relationship between a $NO_x$ storing speed and a $NO_x$ stored amount.

That is, the relationship between the amount of NO$_x$ including the NO$_2$ cold stored in the NO$_x$ absorbent 47 (NO$_x$ stored amount) and the amount of NO$_x$ including NO$_2$ cold stored in the NO$_x$ absorbent 47 per unit time (NO$_x$ storing speed) becomes the relationship where the NO$_x$ storing speed becomes smaller the larger the NO$_x$ stored amount as shown in FIG. 8b when the temperature of the NO$_x$ storing catalyst 11 is constant. Therefore, if finding in advance the relationship such as shown in FIG. 8b for when the temperature TC of the NO$_x$ storing catalyst 11 is the above temperature Td, by using the NO$_2$ stored amount Qa estimated at step 201 as the NO$_x$ stored amount, it is possible to find the corresponding NO$_x$ storing speed, that is, the NO$_x$ storing speed Vb to be found.

When the NO$_x$ storing speed Vb is estimated at step 205, at the next step 207, the judgment criteria speed Vx is calculated based on the NO$_x$ storing speed Vb. This judgment criteria speed Vx is used in the later step 209 and is found for example by the equation Vx=Vb−β (where β≧0). Here, the constant β is a safety margin for suppressing the occurrence of the above-mentioned seepage phenomenon and can be suitably set.

When the judgment criteria speed Vx is calculated at step 207, the routine proceeds to step 209. At step 209, it is judged if the NO$_x$ release speed Va is the judgment criteria speed Vx or more. When it is judged here that the NO$_x$ release speed Va is less than the judgment criteria speed Vx, the control routine is ended and the engine continues normal operation. On the other hand, when it is judged that the NO$_x$ release speed Va is the judgment criteria speed Vx or more, the routine proceeds to step 211, where the temperature raising control and the NO$_x$ release and reduction control are executed. Note that the control at step 211 is similar to the controls from step 109 to step 119 of FIG. 5, so an explanation will be omitted.

As explained above, by this method, the temperature raising control (and succeeding NO$_x$ release and reduction control) is executed when the NO$_x$ release speed Va when the temperature TC of the NO$_x$ storing catalyst 11 is the temperature Td becomes greater than or equal to the judgment criteria speed Vx set to not more than the NO$_x$ storing speed Vb based on the NO$_x$ storing speed Vb when the temperature TC of the NO$_x$ storing catalyst 11 is the temperature Td. Therefore, it is possible to suppress the release of NO$_x$ to the atmosphere—believed to occur as a result of the NO$_x$ release speed becoming larger than the NO$_x$ storing speed when the temperature TC of the NO$_x$ storing catalyst 11 is raised to the temperature Td and the catalyst is activated. That is, according to this method, it is possible to substantially suppress the release from the NO$_x$ absorbent 47 of the NO$_2$ cold stored in the NO$_x$ absorbent 47 in the state where the NO$_x$ storing catalyst 11 is not activated and raise the temperature of the NO$_x$ storing catalyst 11 to activate it. That is, it is possible to suppress the occurrence of the above seepage phenomenon. Further, in this method as well, the NO$_x$ release and reduction control is executed, so it is possible to get NO$_x$ released from the NO$_x$ absorbent 47 and reduce and purify it.

As explained above, by this method as well, in the same way as the method explained with reference to FIG. 5, it is possible to suppress the occurrence of the seepage phenomenon explained above and use the NO$_x$ storing catalyst 11 to purify the NO$_2$ in the exhaust gas so as to suppress emission of NO$_x$ into the atmosphere.

Next, still another method able to be worked by the configuration shown in FIG. 1, that is, still another method to suppress the occurrence of the seepage phenomenon explained above and use the NO$_x$ storing catalyst 11 to purify the NO$_2$ in the exhaust gas so as to suppress emission of NO$_x$ into the atmosphere, will be explained with reference to FIG. 9. Note that this method includes parts common with the methods explained previously with reference to FIG. 5 and FIG. 7. The explanations of these parts will in principle be omitted.

As explained above, if the $NO_x$ release speed (amount of release of $NO_x$ per unit time) when cold stored $NO_2$ is released from the $NO_x$ absorbent 47 when making the temperature TC of the $NO_x$ storing catalyst 11 the temperature Td for the $NO_x$ release and reduction control is less than or equal to the $NO_x$ storing speed (amount of storing of $NO_x$ per unit time) to the $NO_x$ absorbent 47 when making the temperature TC of the $NO_x$ storing catalyst 11 the temperature Td, it is believed that no release of cold stored $NO_2$ substantially occurs when raising the temperature TC of the $NO_x$ storing catalyst 11 to the temperature Td to activate the catalyst. However, even in this case, the $NO_x$ exhausted from the internal combustion engine may end up being released into the atmosphere. The method explained below attempts to further suppress the release of $NO_x$ into the atmosphere considering also the $NO_x$ exhausted from the internal combustion engine during such a temperature raising control etc.

FIG. 9 is a flow chart showing the control routine of this method. This control routine is executed by interruption every certain time by the ECU 30 at the time of normal operation of the engine. When this control routine starts, first, at step 301, the $NO_2$ stored amount Qa at that point of time is estimated. The control at step 301 is similar to the control at step 101 of FIG. 5 and step 201 of FIG. 7.

When the $NO_2$ stored amount Qa is estimated at step 301, the routine proceeds to step 303. At step 303, the release speed Va of $NO_x$ from the $NO_x$ absorbent 47 when the temperature TC of the $NO_x$ storing catalyst 11 is the predetermined temperature Td is estimated. The control at step 303 is similar to the control at step 203 of FIG. 7.

Next, at step 305, the speed of production of $NO_x$ by combustion in the internal combustion engine, that is, the $NO_x$ exhaust speed (amount of $NO_x$ exhaust per unit time) Ve from the internal combustion engine, is estimated. The $NO_x$ exhaust speed Ve from the internal combustion engine is estimated based on for example the operating state of the internal combustion engine. In this case, for example, the engine speed and the fuel injection amount are used as indicators expressing the operating state. The $NO_x$ exhaust speed Ve in each operating state expressed by these is found in advance by experiments etc. and stored as a map. The map is used to find the $NO_x$ exhaust speed Ve based on the operating state at any particular time.

When the $NO_x$ exhaust speed Ve is estimated at step 305, the routine proceeds to step 307. At step 307, the $NO_x$ storing speed Vb to the $NO_x$ absorbent 47 when the temperature TC of the $NO_x$ storing catalyst 11 is the temperature Td is estimated. Further, when the $NO_x$ storing speed Vb is estimated at step 307, at the next step 309, the judgment criteria speed Vx used at step 311 is calculated based on the $NO_x$ storing speed Vb (for example, $Vx=Vb-\beta$ (where $\beta \geqq 0$)). The controls at these steps 307 and 309 are similar to the controls at steps 205 and 207 of FIG. 7, respectively.

When the judgment criteria speed Vx is calculated at step 309, the routine proceeds to step 311. At step 311, it is judged if the sum (Va+Ve) of the $NO_x$ release speed Va and the $NO_x$ exhaust speed Ve is the judgment criteria speed Vx or more. When it is judged here that the sum of the $NO_x$ release speed Va and the $NO_x$ exhaust speed Ve is less than the judgment criteria speed Vx, this control routine ends and the engine continues normal operation. On the other hand, when it is judged that the sum of the $NO_x$ release speed Va and the $NO_x$ exhaust speed Ve is the judgment criteria speed Vx or more, the routine proceeds to step 313, where the temperature raising control and the $NO_x$ release and reducing control are executed. Note that the control at step 313 is similar to the control of step 211 of FIG. 7, that is, similar to the controls from step 109 to step 119 of FIG. 5, so an explanation is omitted here.

As explained above, by this method, the temperature raising control (and succeeding $NO_x$ release and reduction control) is executed when the sum of the $NO_x$ release speed Va when the temperature TC of the $NO_x$ storing catalyst 11 is the temperature Td and the $NO_x$ exhaust speed Ve from the internal combustion engine becomes greater than or equal to the judgment criteria speed Vx set to not more than the $NO_x$ storing speed Vb based on the $NO_x$ storing speed Vb when the temperature TC of the $NO_x$ storing catalyst 11 is the temperature Td. Therefore, it is possible to suppress the release of $NO_x$ to the atmosphere—believed to occur as a result of the $NO_x$ release speed becoming larger than the $NO_x$ storing speed when the temperature TC of the $NO_x$ storing catalyst 11 is raised to the temperature Td and the catalyst is activated, and to suppress the release into the atmosphere of the $NO_x$ exhausted from the internal combustion engine as well. That is, according to this method, it is possible to substantially suppress the release from the $NO_x$ absorbent 47 of the $NO_2$ cold stored in the $NO_x$ absorbent 47 in the state where the $NO_x$ storing catalyst 11 is not activated, suppress the release of $NO_x$ exhausted from the internal combustion engine into the atmosphere, and raise the temperature of the $NO_x$ storing catalyst 11 to activate it. That is, it is possible to suppress the occurrence of the above seepage phenomenon and possible to suppress the release of $NO_x$ exhausted from the internal combustion engine into the atmosphere during the temperature raising control etc. Further, in this method as well, the $NO_x$ release and reduction control is executed, so it is possible to get $NO_x$ released from the $NO_x$ absorbent 47 and reduce and purify it.

As explained above, by this method as well, in the same way as the method explained with reference to FIG. 5 and FIG. 9, it is possible to suppress the occurrence of the seepage phenomenon explained above and use the $NO_x$ storing catalyst 11 to purify the $NO_2$ in the exhaust gas so as to suppress emission of $NO_x$ into the atmosphere.

Figure 10:
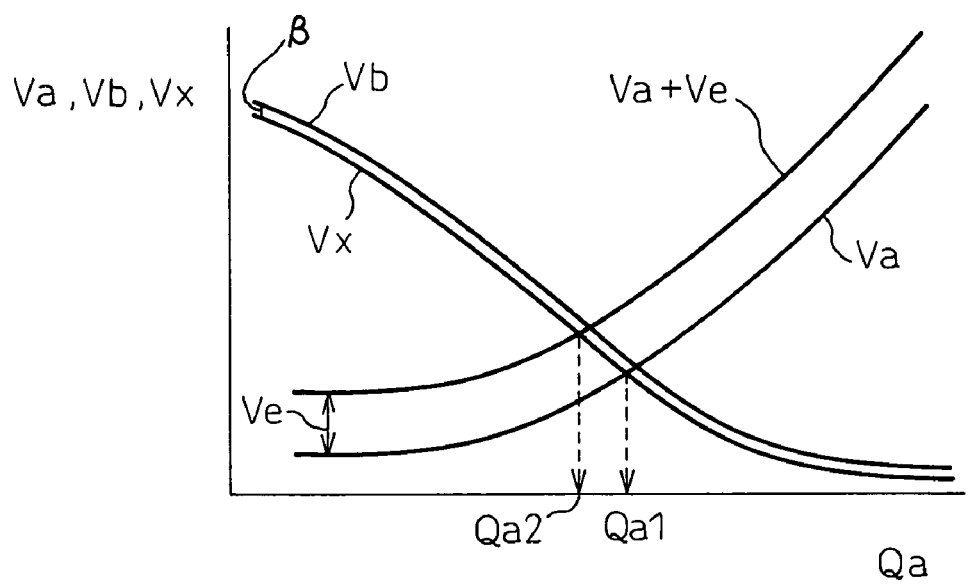
FIG. 10 is an explanatory view illustrating the relationship among a $NO_x$ release speed Va from a $NO_x$ absorbent, a $NO_x$ exhaust speed Ve from the engine, a $NO_x$ storing speed Vb to the $NO_x$ absorbent, a judgment criteria speed Vx, etc. using as the abscissa the $NO_2$ stored amount Qa of the $NO_x$ absorbent.

FIG. 10 is an explanatory view showing the relationship among the $NO_x$ release speed Va, $NO_x$ exhaust speed Ve, $NO_x$ storing speed Vb, judgment criteria speed Vx, etc. indicating the $NO_2$ stored amount Qa on the abscissa. When based on FIG. 10, in the method explained with reference to FIG. 7, the temperature raising control (and succeeding $NO_x$ release and reduction control) is executed when the $NO_2$ stored amount Qa becomes Qa1 or more, while in the method explained with reference to FIG. 9, the temperature raising control (and succeeding $NO_x$ release and reduction control) is executed when the $NO_2$ stored amount Qa becomes Qa2 or more.

However, as explained above, the nitrogen dioxide $NO_2$ contained in the exhaust gas is cold stored in the $NO_x$ absorbent 47 even if the $NO_x$ storing catalyst 11 is not activated, but the nitrogen monoxide NO contained in the exhaust gas is not hot stored in the $NO_x$ absorbent 47 unless the $NO_x$ storing catalyst 11 is activated and it is oxidized to nitrogen dioxide $NO_2$. Therefore, when the $NO_x$ storing catalyst 11 is not activated, it is preferable to reduce the amount of nitrogen monoxide NO in the exhaust gas and increase the amount of nitrogen dioxide $NO_2$ in the exhaust gas. Therefore, in an embodiment of the present invention, the ratio of the nitrogen dioxide $NO_2$ to the nitrogen monoxide NO produced at the time of combustion under a lean air-fuel ratio when the $NO_x$ storing catalyst 11 is not activated may be increased compared with when the $NO_x$ storing catalyst 11 is activated under the same engine operating state, that is, the same speed and same torque.

It becomes clear that the ratio of $NO_2$ (amount of $NO_2$/amount of NO) increases when burning the fuel gently. If for example employing at least one of delay of the fuel injection timing, increase of the amount of EGR gas, pilot injection, or premixed combustion, the combustion becomes gentler. Therefore, when increasing the amount of nitrogen dioxide $NO_2$ in the exhaust gas such as explained above in the embodiments of the present invention, at least one of the above techniques for achieving gentler combustion is adopted when the $NO_x$ storing catalyst 11 is not activated so as to achieve gentler combustion compared with when the $NO_x$ storing catalyst is activated in the same engine operating state.

Note that in the above explanation, the temperature raising control was performed by controlling the fuel injection patterns, but the invention is not limited to this. For example, it is also possible to use an electric heater or use another means to raise the temperature of the $NO_x$ storing catalyst 11.

While the invention has been described with reference to specific embodiments chosen for purpose of illustration, it should be apparent that numerous modifications could be made thereto by those skilled in the art without departing from the basic concept and scope of the invention.

The invention claimed is:

1. An exhaust purification device for an internal combustion engine having, a $NO_x$ storing catalyst arranged in an engine exhaust passage, the $NO_x$ storing catalyst being comprised of a precious metal catalyst and a $NO_x$ absorbent and, when an air-fuel ratio of inflowing exhaust gas is lean, cold storing nitrogen dioxide $NO_2$ contained in the exhaust gas in the $NO_x$ absorbent when not activated and hot storing cold stored nitrogen dioxide $NO_2$ in the $NO_x$ absorbent when activated, said exhaust purification device for an internal combustion engine making the nitrogen dioxide $NO_2$ contained in the exhaust gas be cold stored in the $NO_x$ absorbent in the state where said $NO_x$ storing catalyst is not activated and executing a $NO_x$ storing catalyst restoring control including at least raising the temperature of said $NO_x$ storing catalyst to a predetermined temperature to activate it when a predetermined $NO_x$ storing catalyst restoring condition is met so as to restore the cold storing capability of said $NO_x$ absorbent in the state where said $NO_x$ storing catalyst is not activated, wherein said $NO_x$ storing catalyst is a $NO_x$ storing catalyst having the function of hot storing nitrogen oxides $NO_x$ contained in exhaust gas in the $NO_x$ absorbent when said $NO_x$ storing catalyst is activated and the air-fuel ratio of the exhaust gas flowing into the $NO_x$ storing catalyst is lean, said device has a $NO_x$ release speed estimating means for estimating a release speed of nitrogen oxides $NO_x$ from said $NO_x$ absorbent when making said $NO_x$ storing catalyst said predetermined temperature and a $NO_x$ storing speed estimating means for estimating a storing speed of nitrogen oxides $NO_x$ to said $NO_x$ absorbent when making said $NO_x$ storing catalyst said predetermined temperature, and said $NO_x$ storing catalyst restoring condition is deemed to be met when the $NO_x$ release speed estimated by said $NO_x$ release speed estimating means becomes greater than or equal to a predetermined speed set to not more than said $NO_x$ storing speed based on the $NO_x$ storing speed estimated by said $NO_x$ storing speed estimating means.

2. An exhaust purification device for an internal combustion engine having, a $NO_x$ storing catalyst arranged in an engine exhaust passage, the $NO_x$ storing catalyst being comprised of a precious metal catalyst and a $NO_x$ absorbent and, when an air-fuel ratio of inflowing exhaust gas is lean, cold storing nitrogen dioxide $NO_2$ contained in the exhaust gas in the $NO_x$ absorbent when not activated and hot storing cold stored nitrogen dioxide $NO_2$ in the $NO_x$ absorbent when activated, said exhaust purification device for an internal combustion engine making the nitrogen dioxide $NO_2$ contained in the exhaust gas be cold stored in the $NO_x$ absorbent in the state where said $NO_x$ storing catalyst is not activated and executing a $NO_x$ storing catalyst restoring control including at least raising the temperature of said $NO_x$ storing catalyst to a predetermined temperature to activate it when a predetermined $NO_x$ storing catalyst restoring condition is met so as to restore the cold storing capability of said $NO_x$ absorbent in the state where said $NO_x$ storing catalyst is not activated, wherein said $NO_x$ storing catalyst is a $NO_x$ storing catalyst having the function of hot storing nitrogen oxides $NO_x$ contained in exhaust gas in the $NO_x$ absorbent when said $NO_x$ storing catalyst is activated and the air-fuel ratio of the exhaust gas flowing into the $NO_x$ storing catalyst is lean, said device has a $NO_x$ release speed estimating means for estimating a release speed of nitrogen oxides $NO_x$ from said $NO_x$ absorbent when making said $NO_x$ storing catalyst said predetermined temperature, a $NO_x$ exhaust speed estimating means for estimating an exhaust speed of nitrogen oxides $NO_x$ from the internal combustion engine, and a $NO_x$ storing speed estimating means for estimating a storing speed of nitrogen oxides $NO_x$ to said $NO_x$ absorbent when making said $NO_x$ storing catalyst said predetermined temperature, and said $NO_x$ storing catalyst restoring condition is deemed to be met when a sum of the $NO_x$ release speed estimated by said $NO_x$ release speed estimating means and the $NO_x$ exhaust speed estimated by said $NO_x$ exhaust speed estimating means becomes greater than or equal to a predetermined speed set to not more than said $NO_x$ storing speed based on the $NO_x$ storing speed estimated by said $NO_x$ storing speed estimating means.

3. An exhaust purification device for an internal combustion engine having, a $NO_x$ storing catalyst arranged in an engine exhaust passage, the $NO_x$ storing catalyst being comprised of a precious metal catalyst and a $NO_x$ absorbent and, when an air-fuel ratio of inflowing exhaust gas is lean, cold storing nitrogen dioxide $NO_2$ contained in the exhaust gas in the $NO_x$ absorbent when not activated and hot storing cold stored nitrogen dioxide $NO_2$ in the $NO_x$ absorbent when activated, said exhaust purification device for an internal combustion engine making the nitrogen dioxide $NO_2$ contained in the exhaust gas be cold stored in the $NO_x$ absorbent in the state where said $NO_x$ storing catalyst is not activated and executing a $NO_x$ storing catalyst restoring control including at least raising the temperature of said $NO_x$ storing catalyst to a predetermined temperature to activate it when a predetermined $NO_x$ storing catalyst restoring condition is met so as to restore the cold storing capability of said $NO_x$ absorbent in the state where said $NO_x$ storing catalyst is not activated, wherein the exhaust purification device further includes a NO$_2$ ratio increasing means for increasing a ratio of nitrogen dioxide NO$_2$ with respect to nitrogen monoxide NO produced at the time of combustion under a lean air-fuel ratio when said NO$_x$ storing catalyst is not activated compared with when the NO$_x$ storing catalyst is activated in the same engine operating state.

* * * * *